United States Patent [19]

Tults

[11] Patent Number: 5,453,795
[45] Date of Patent: Sep. 26, 1995

[54] HORIZONTAL LINE COUNTER INSENSITIVE TO LARGE PHASE SHIFTS OF VIDEO

[75] Inventor: Juri Tults, Indianapolis, Ind.

[73] Assignee: Thomson Consumer Electronics, Inc., Indianapolis, Ind.

[21] Appl. No.: 142,421

[22] PCT Filed: Jun. 15, 1992

[86] PCT No.: PCT/US92/04825

§ 371 Date: Nov. 22, 1993

§ 102(e) Date: Nov. 22, 1993

[30] Foreign Application Priority Data

Jul. 2, 1991 [GB] United Kingdom ............... 9114245

[51] Int. Cl.$^6$ ............................................. H04N 7/087
[52] U.S. Cl. ...................... 348/465; 348/500; 348/521
[58] Field of Search ............................ 358/148, 158, 358/150, 147; 348/461, 465, 464, 510, 536, 540, 546, 596, 500, 521; H04N 7/00, 7/08, 7/087

[56] References Cited

U.S. PATENT DOCUMENTS

| | | | |
|---|---|---|---|
| 3,576,391 | 4/1971 | Houghton | 178/5.6 |
| 4,160,993 | 7/1979 | Merrell | 358/21 V |
| 4,384,304 | 5/1983 | Ohta et al. | 348/478 |
| 4,464,679 | 8/1984 | Wargo | 358/148 |
| 4,684,986 | 8/1987 | Steenhof et al. | 358/148 |

FOREIGN PATENT DOCUMENTS

| | | | |
|---|---|---|---|
| 1929083 | 7/1970 | Germany . | |
| 3038088.2 | 9/1982 | Germany . | |
| 0229590 | 11/1985 | Japan | 358/148 |
| 1533238 | 11/1978 | United Kingdom . | |

Primary Examiner—David E. Harvey
Attorney, Agent, or Firm—Joseph S. Tripoli; Peter M. Emanuel; Robert D. Shedd

[57] ABSTRACT

A horizontal line counter (110,115,120) provides a signal (LINE #21) identifying the beginning of video data in a particular horizontal video line. The counter is clocked by multiple clock signals. A first clock signal (HOR PLS) clocks the counter until the line count value equals a known value that is less than the line number of the horizontal line that is to be identified. When the count value equals the known value, clocking by a second clock signal (COMP SYNC) is enabled. Although, the first clock source provides a regular pulse waveform suitable for clocking the counter reliably, transitions on the first clock signal may not accurately indicate the beginning of information within a horizontal line interval. Transitions on the second clock signal accurately indicate the beginning of the desired information. However, the waveform of the second clock signal may exhibit irregularities prior to the time at which clocking by the second clock signal is enabled that could adversely affect the reliability of the counter value. The combined clocking arrangement advantageously provides significantly higher reliability of the count value and improves the timing of the line identification signal with respect to the beginning of the desired video data.

13 Claims, 3 Drawing Sheets

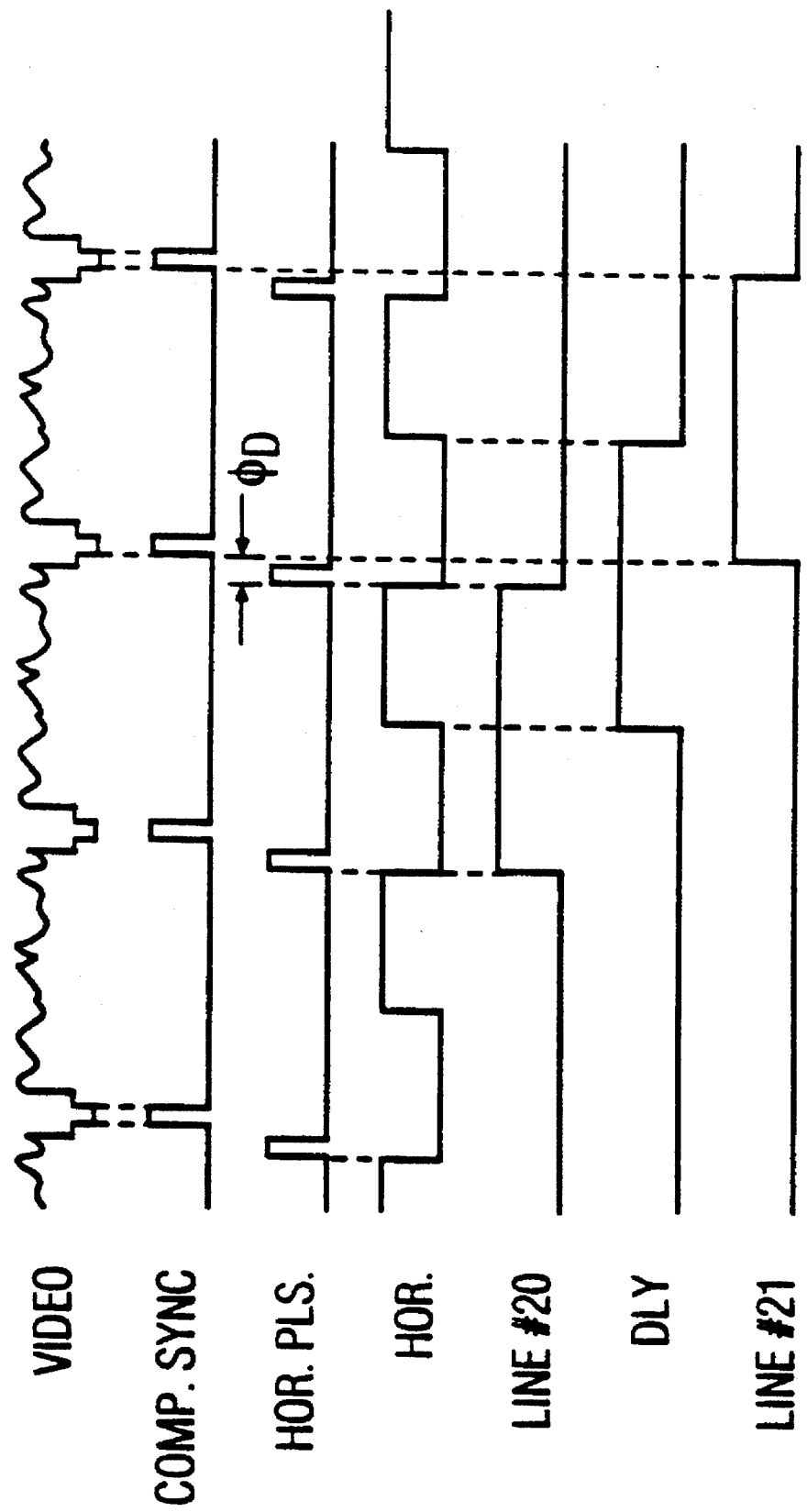

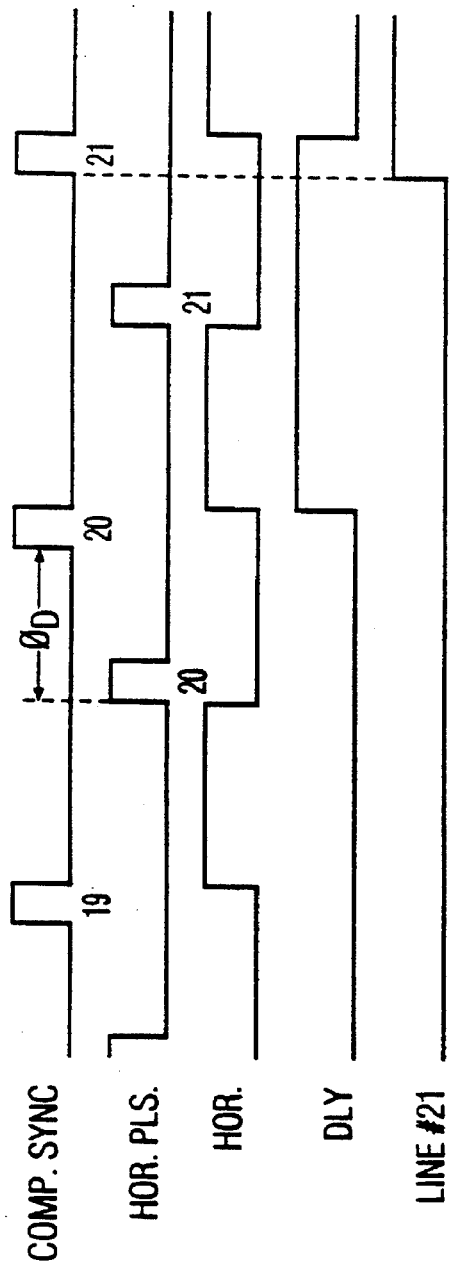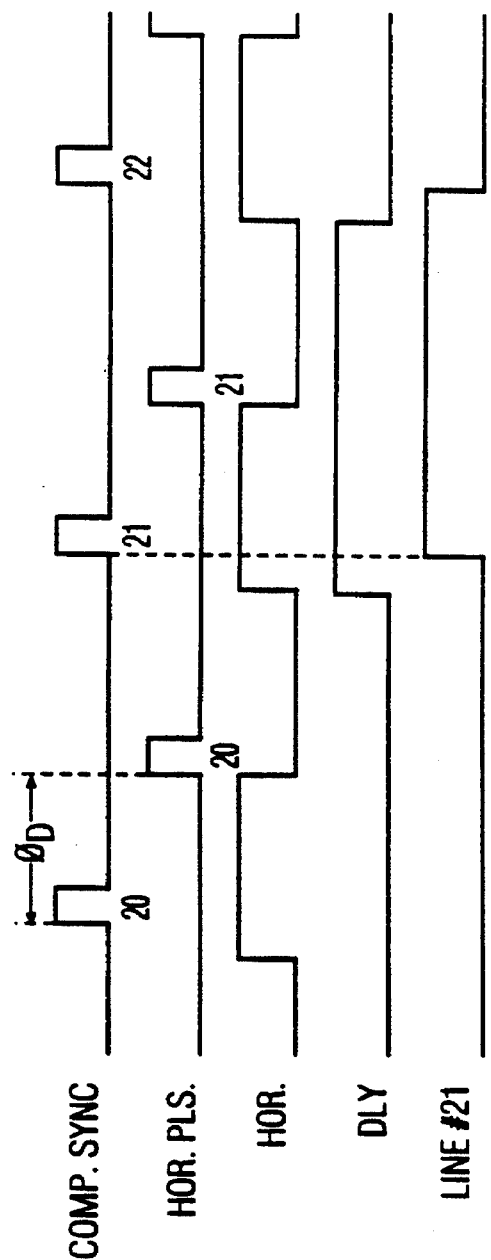

HORIZONTAL LINE COUNTER INSENSITIVE TO LARGE PHASE SHIFTS OF VIDEO

FIELD OF THE INVENTION

The present invention relates to detection of information that may be present in a video signal during vertical blanking intervals.

BACKGROUND OF THE INVENTION

A video signal typically includes vertical display intervals that comprise a plurality of horizontal line intervals, e.g. 525 lines per vertical interval in NTSC video systems. A portion of each vertical interval is usually designated as a vertical blanking interval. The vertical blanking interval may span a plurality of horizontal line intervals, e.g. in excess of 20 horizontal line intervals. The beginning of each vertical and horizontal interval is identified by respective vertical and horizontal sync pulses that are included in a composite video signal.

The content of the video signal during blanking intervals is usually not intended for display as part of the normal video image. The lack of image information in blanking intervals makes it possible to insert auxiliary information, e.g. teletext and closed caption data, into blanking intervals. The standards for each type of auxiliary information specify the positioning of the information within a vertical blanking interval. For example, the present closed captioning standard (see e.g. 47 CFR §§15.119 and 73.682) specifies that digital data corresponding to ASCII characters for closed captioning must be in line 21 of vertical blanking.

An approach to recovery of auxiliary information is to accurately identify a specific line interval, e.g. line 21, containing auxiliary information during a vertical blanking interval by counting horizontal sync pulses. For example, a horizontal line counter could be initialized by a vertical sync pulse and clocked by horizontal sync pulses. Ideally, the count value would then represent the line number.

A video receiver may produce various versions of horizontal and vertical sync signals that might be used to control a line counter. For example, a sync separator may produce sync signals directly from the received composite video signal. FCC requirements specify precise timing limits for composite video signals. These timing limits might suggest that the output of a sync separator would be a reliable source of control signals for a line counter. However, weak signals combined with the occurrence of equalization pulses during vertical blanking may produce an irregular horizontal sync pulse waveform at the sync separator output that is not a reliable source of clock pulses for a line counter. Thus, it may be desirable to use a more regular horizontal sync waveform to clock a line counter. For example, the output of a horizontal phase-locked-loop (PLL) that is typically included in a video receiver for deflection purposes produces a regular pulse waveform at the horizontal line rate.

As a result of FCC specifications, the start of data within any horizontal line is accurately timed with respect to the composite video or sync separator output, but not necessarily with respect to the horizontal PLL output. Minor timing shifts do not adversely affect the display of normal video images. However, significant timing errors may be introduced if the operation of the horizontal PLL is disturbed. For example, switching between the dual video read heads in a video cassette recorder (VCR) may produce an abnormal horizontal line period that differs significantly from the nominal 64 µs period. The deviation in the line period may produce a perturbation in the horizontal PLL that is manifested as a substantial phase shift between the composite sync signal at the sync separator output and the horizontal pulse waveform at the horizontal PLL output. The locking action of the PLL gradually corrects the perturbation such that the phase error is substantially eliminated before visible display begins. A significant phase shift may exist, however, for many of the line periods within vertical blanking. Thus, the actual beginning of the information in a horizontal line during vertical blanking as indicated by the sync separator output may differ in time from the beginning of the same line as indicated by the output of a horizontal PLL.

The residual phase shift that remains during line intervals within vertical blanking may preclude retrieving auxiliary video data that occurs during line periods within the vertical blanking interval. For example, consider a closed caption decoder that identifies the beginning of closed caption data in line 21 based on the count value from a line counter that is clocked by the output of a horizontal PLL. If the video signal containing closed caption data originates in a VCR, the horizontal PLL error caused by read head switching may cause the line counter to exhibit the value 21 at a time that is not synchronized to the beginning of data in line 21. Thus, the closed caption decoder would be attempting to extract closed caption data from line 21 either before or after line 21 actually begins. Corrupted closed caption data may be produced.

SUMMARY OF THE INVENTION

A horizontal line counter provides a signal identifying the beginning of video data in a particular horizontal video line. The counter is clocked by multiple clock signals. A first clock signal clocks the counter until the line count value equals a known value that is less than the line number of the horizontal line that is to be identified. When the count value equals the known value, clocking by a second clock signal is enabled. Although the first clock source provides a regular pulse waveform suitable for clocking the counter reliably, transitions of the first clock signal may not accurately indicate the beginning of information within a horizontal line interval. Transitions of the second clock signal accurately indicate the beginning of the desired information. However, the waveform of the second clock signal may exhibit irregularities prior to the time at which clocking by the second clock signal is enabled that could adversely affect the reliability of the counter value. The combined clocking arrangement advantageously provides significantly higher reliability of the count value and improves the timing of the line identification signal with respect to the beginning of the desired video data.

BRIEF DESCRIPTION OF THE DRAWING

FIGS. 2, 3A, and 3B show signal waveforms useful for understanding the operation of the embodiment in FIG. 1.

DETAILED DESCRIPTION OF THE DRAWING

Figure 1:
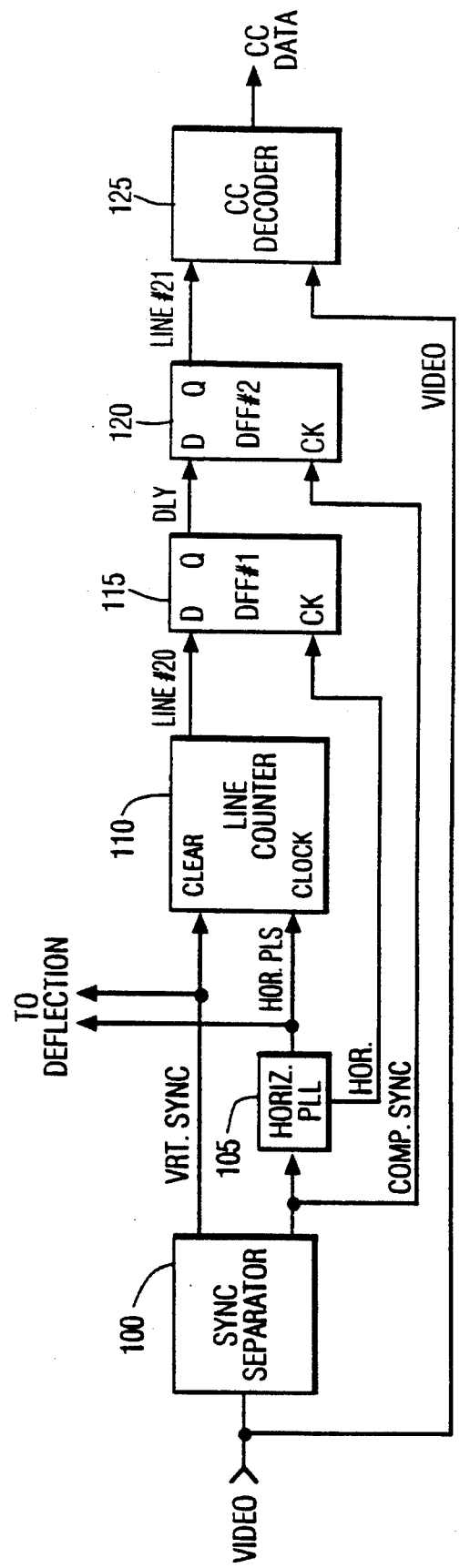
FIG. 1 shows in block diagram form an embodiment of the invention.

FIG. 1 shows an exemplary embodiment of the invention in a system for decoding closed caption data that occurs during horizontal line 21. In FIG. 1, an input video signal VIDEO is coupled to sync separator 100. Sync separator 100 produces a vertical sync signal VRT SYNC and a composite sync signal COMP SYNC. Signal VRT SYNC is coupled to horizontal line counter 110 to reset or clear the counter when a vertical sync pulse occurs on signal VRT SYNC. Composite sync signal COMP SYNC is coupled to horizontal phase-locked loop (PLL) 105.

Horizontal PLL 105 generates a horizontal pulse signal HOR PLS that repeats with a period equal to the horizontal line period. Signal HOR PLS is coupled to the clock input of line counter 110. Horizontal PLL 105 also generates a second signal HOR that also has a period equal to the horizontal line period. However, signal HOR exhibits a greater duty cycle, e.g. 50%, than does signal HOR PLS. The timing of signal HOR is such that one transition of pulses on signal HOR is aligned with the opposite transition of pulses on signal HOR PLS. The alignment of opposite transitions on signals HOR and HOR PLS produces a delay between the same transitions on signals HOR and HOR PLS. For example, if signal HOR exhibits approximately a 50% duty cycle and if the falling edges of signal HOR are aligned with the rising edges of signal HOR PLS, a delay of approximately one-half a horizontal line period exists between the rising edges of signal HOR and the rising edges of signal HOR PLS. This delay is used advantageously as described below.

Signal LINE #20 in FIG. 1 is an output of line counter 110 that indicates when line 20 is currently being received. Signal LINE #20 may be generated, for example, when the count value has been incremented in response to clock signal HOR PLS to a value of 20. Signal LINE #20 is coupled to the "D" input of D-type register 115. The clock input of register 115 is coupled to signal HOR. Counter 110 and register 115 are both triggered on the same transition, e.g. rising-edge triggered. The above-described one-half horizontal line period delay between the same polarity transitions of signals HOR PLS and HOR causes register 115 to be clocked one-half horizontal line period after counter 110 is clocked. Thus, register 115 will be clocked after signal LINE #20 has stabilized to produce at the output of register 115 a signal DLY that is a delayed version of signal LINE #20. The delay between signals LINE #20 and DLY is approximately one-half horizontal line period.

The output of register 115 is coupled to the "D" input of register 120. Register 120 is clocked by composite sync signal COMP SYNC from horizontal PLL 105. When horizontal PLL 105 is operated normally, i.e. stable locked state, transitions on signal COMP SYNC are approximately aligned with corresponding transitions on signal HOR PLS causing register 120 to be clocked at approximately the same time as counter 110. The output of register 120 is a signal LINE #21 that indicates the beginning of line number 21 of a video field where closed caption data is located. Signal LINE #21 is coupled to closed caption decoder 125 to initiate the extraction of closed caption data from the video signal VIDEO that is also coupled to closed caption decoder 125.

The operation of the above-described circuit is explained below. The following description may be better understood by referring to the signal waveforms shown in FIG. 2. For the purposes of the exemplary embodiment in FIG. 1 and the waveforms in FIG. 2, the registers and counters are assumed to be positive-edge triggered. It will be apparent to one skilled in the art that negative-edge triggered devices may also be used. One skilled in the art will also realize that the embodiment in FIG. 1 may be readily adapted to line numbers other than line 21.

Line counter 110 is reset at the beginning of a field by signal VRT SYNC. Line counter 110 increments in response to pulses on signal HOR PLS to indicate the number of pulses or lines that have been received. If a disturbance is introduced into composite sync signal COMP SYNC, horizontal PLL 105 will be perturbed introducing a significant phase shift between subsequent pulses on signal COMP SYNC and pulses on either signal HOR PLS or HOR until horizontal PLL 105 stabilizes. During the time that horizontal PLL 105 is stabilizing, transitions on signal COMP SYNC continue to accurately indicate the beginning of each horizontal line. However, signal COMP SYNC may exhibit irregular pulse waveforms until the equalizing pulse interval of vertical blanking has been completed, e.g. by line 20. Thus, counter 110 is clocked by the more reliable waveform of signal HOR PLS even though the clocking is time shifted with respect to signal COMP SYNC and the beginning of video in each line. During this time, changing count values at the output of counter 110 do not accurately indicate the beginning horizontal line periods.

When the count value at the output of counter 110 reaches 20, signal LINE #20 transitions to a new state, e.g. from logic 0 to logic 1. The next rising edge of signal HOR (delayed by one-half cycle with respect to the corresponding rising edge of signal HOR PLS) clocks the new value on signal LINE #20 through register 115 causing a transition on signal DLY. By the time that line 20 has been reached, the transitions on signal COMP SYNC are adequate to clock a register. Thus, the next rising edge of signal COMP SYNC, which corresponds to the beginning of video in line 21, clocks the changed state of signal DLY through register 120 causing a change in the state of signal LINE #21. The alignment of signal LINE #21 with the transition on signal COMP SYNC differs by the negligible clock-to-output delay of register 120. Therefore, an accurate indication of the beginning of the video information on line 21 is communicated to closed caption decoder 125 via signal LINE #21.

Signal LINE #21 will provide an accurate indication of the beginning of line 21 despite a phase shift between signals HOR PLS and COMP SYNC that may be almost as large as one-half horizontal line period. The phase shift may be such that signal HOR PLS is shifted either before or after signal COMP SYNC by an amount approaching one-half line period without affecting the validity of signal LINE #21. The flexibility in the relative positioning of signal HOR PLS with respect to signal COMP SYNC is provided by the one-half line period delay introduced by using signal HOR rather than signal HOR PLS to clock register 115. For example, consider the timing situations shown in FIGS. 3A and 3B. In FIG. 3A, the rising edges of signal HOR PLS are phase shifted prior to corresponding edges of signal COMP SYNC by slightly less than one-half line period. In this case, register 115 is clocked by signal HOR to produce signal DLY (indicating line 20) slightly after the rising edge of signal COMP SYNC. Thus, the next rising edge of signal COMP SYNC (indicating the beginning of line 21) will reliably clock register 120 to generate signal LINE #21. FIG. 3B shows rising edges of signal HOR PLS phase shifted after corresponding rising edges of signal COMP SYNC by slightly less than one-half a horizontal line period. In this case, register 115 is clocked by signal HOR to produce signal DLY slightly before the pulse on signal COMP SYN that indicates the beginning of line 21. Thus, signal LINE #21 transitions in response to the correct pulse on signal COMP SYN. The delay between signals HOR and HOR PLS may be modified to other values less than one-half a horizontal line period by, for example, selecting a duty cycle for signal HOR other than the 50% duty cycle that is described above and shown in FIG. 2. In addition to modifying the duty cycle, the circuit shown in FIG. 1 should be changed to ensure that the pulse on signal DLY remains symmetrical with respect to the pulse on signal HOR PLS corresponding to line 21 as shown in FIGS. 3A and 3B.

As shown in FIG. 1, signals VRT SYNC and HOR PLS may be coupled to deflection circuits if the video receiver includes means for displaying the video information, e.g. a cathode ray tube. However, the invention may also be useful in the context of a video receiver in a VCR where deflection circuits are not present.

I claim:

1. Apparatus for processing a video signal having a vertical display interval including a plurality of horizontal display intervals, said apparatus comprising:

means for producing a first pulse waveform including pulses occurring at a rate related to a frequency of occurrence of said horizontal display intervals, each of said pulses included in said first pulse waveform being subject to exhibiting a phase error with respect to the beginning of a respective one of said horizontal display intervals;

means for producing a second pulse waveform including pulses synchronized with respective ones of said horizontal display intervals for indicating the beginning of each of said horizontal display intervals; and means for counting said horizontal display intervals during a first portion of said vertical display interval in response to said first pulse waveform, and for counting in response to said second pulse waveform during a second portion of said vertical display interval; wherein said second portion of said vertical display interval beginning in response to a predetermined number of said horizontal display intervals being counted during said first portion of said vertical interval.

2. Apparatus according to claim 1, wherein
said first portion of said vertical display interval including a first one of said horizontal display intervals through a twentieth one of said horizontal display intervals.

3. Apparatus according to claim 1, wherein
said first portion of said vertical display interval including a first one of said horizontal display intervals through a horizontal display interval penultimate to a predetermined one of said horizontal display interval.

4. Apparatus according to claim 1, wherein
said means for producing said first pulse waveform comprises a phase locked loop circuit, and said means for producing said second pulse waveform comprises a sync separator circuit responsive to said video signal.

5. Apparatus according to claim 1, wherein
said pulses included in said first pulse waveform exhibiting substantially uniform pulse amplitudes during said first portion of said vertical display interval; and
said pulses included in said second pulse waveform being subject to exhibiting varying pulse amplitudes during said first portion of said vertical display interval.

6. Apparatus for processing a video signal having a vertical display interval including a plurality of horizontal display intervals, said apparatus comprising:

means for producing a first clock signal including pulses occurring at a rate related to a frequency of occurrence of said horizontal display intervals, each of said pulses included in said first clock signal being subject to exhibiting a phase error with respect to the beginning of a respective one of said horizontal display intervals;

means for producing a second clock signal including pulses synchronized with respective ones of said horizontal display intervals for indicating the beginning of each of said horizontal display intervals;

means for counting said horizontal display intervals in response to said first clock signal, and for generating a control signal indicating occurrence of a first predetermined one of said horizontal display intervals; and means responsive to said second clock signal for delaying said control signal to produce a delayed signal exhibiting a desired timing relationship to a second predetermined one of said horizontal display intervals.

7. Apparatus according to claim 6, wherein
said pulses included in said first clock signal exhibiting substantially uniform pulse amplitudes during a portion of said vertical display interval in which said counting means counts responsive to said first clock signal; and
said pulses included in said second clock signal being subject to exhibiting varying pulse amplitudes during said portion of said vertical display interval.

8. Apparatus according to claim 7, wherein
said means for producing said first clock signal comprises a phase locked loop circuit; and
said means for producing said second clock signal comprises a sync separator circuit.

9. Apparatus according to claim 8, wherein said delaying means comprises a D-type flip-flop having a data input coupled to receive said control signal produced by said counting means, and having a clock input coupled to receive said second clock signal.

10. Apparatus for decoding closed caption data included in one of a plurality of horizontal display intervals included in a vertical display interval of a video signal, said apparatus comprising:

means for producing a first clock signal including pulses occurring at a rate related to a frequency of occurrence of said horizontal display intervals, each of said pulses included in said first clock signal being subject to exhibiting a phase error with respect to the beginning of a respective one of said horizontal display intervals;

means for producing a second clock signal including pulses synchronized with respective ones of said horizontal display intervals for indicating the beginning of each of said horizontal display intervals;

means for counting said horizontal display intervals in response to said first clock signal, and for generating a control signal indicating occurrence of one of said horizontal display intervals preceding said horizontal line interval including said closed caption data; and means responsive to said second clock signal for delaying said control signal to produce a delayed signal exhibiting a desired timing relationship to a beginning of said horizontal display interval including said closed caption data.

11. Apparatus according to claim 10, wherein
said pulses included in said first clock signal exhibiting substantially uniform pulse amplitudes during a portion of said vertical display interval in which said counting means counts responsive to said first clock signal; and
said pulses included in said second clock signal being subject to exhibiting varying pulse amplitudes during said portion of said vertical display interval.

12. Apparatus according to claim 11, wherein said means for producing said first clock signal comprises a phase locked loop circuit; and said means for producing said second clock signal comprises a sync separator circuit.

13. Apparatus according to claim 12, wherein said delaying means comprises a D-type flip-flop having a data input coupled to receive said control signal produced by said counting means, and having a clock input coupled to receive said second clock signal.

* * * * *